(12) United States Patent
Wakimoto et al.

(10) Patent No.: US 11,437,652 B2
(45) Date of Patent: Sep. 6, 2022

(54) METHOD OF MANUFACTURING SQUARE SECONDARY BATTERY

(71) Applicant: SANYO Electric Co., Ltd., Daito (JP)

(72) Inventors: Ryoichi Wakimoto, Hyogo (JP); Atsushi Tsuji, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 564 days.

(21) Appl. No.: 16/335,750

(22) PCT Filed: Sep. 28, 2017

(86) PCT No.: PCT/JP2017/035094
§ 371 (c)(1),
(2) Date: Mar. 22, 2019

(87) PCT Pub. No.: WO2018/062339
PCT Pub. Date: Apr. 5, 2018

(65) Prior Publication Data
US 2019/0237809 A1   Aug. 1, 2019

(30) Foreign Application Priority Data

Sep. 30, 2016 (JP) .............................. JP2016-192732

(51) Int. Cl.
*H01M 10/0585* (2010.01)
*H01M 10/04* (2006.01)
(Continued)

(52) U.S. Cl.
CPC ....... *H01M 10/0585* (2013.01); *H01M 10/04* (2013.01); *H01M 50/10* (2021.01);
(Continued)

(58) Field of Classification Search
CPC .. H01M 10/0585; H01M 50/10; H01M 50/60; H01M 50/147; H01M 50/463;
(Continued)

(56) References Cited

U.S. PATENT DOCUMENTS

2011/0195287 A1   8/2011   Kamifuji et al.
2016/0336574 A1*  11/2016  Guen .................. H01M 50/155
2017/0047571 A1   2/2017   Iwasaki et al.

FOREIGN PATENT DOCUMENTS

JP    11-354095 A    12/1999
JP    2001-38475 A   2/2001
(Continued)

OTHER PUBLICATIONS

International Search Report dated Dec. 12, 2017, issued in counterpart International Application No. PCT/JP2017/035094 (1 page).

*Primary Examiner* — Kaity V Chandler
(74) *Attorney, Agent, or Firm* — WHDA, LLP

(57) ABSTRACT

A method of manufacturing a secondary battery including an electrode body element fabricating step in which a first electrode body element including a positive electrode plate and a negative electrode plate, and a second electrode body element including a positive electrode plate and a negative electrode plate are fabricated, a tab-connecting step in which a first positive electrode tab group of the first electrode body element and a second positive electrode tab group of the second electrode body element are connected to a second positive electrode collector, and a first negative electrode tab group of the first electrode body element and a second negative electrode tab group of the second electrode body element are connected to a second negative electrode collector, and an electrode body fabricating step in which, after the tab-connecting step, the first electrode body element and the second electrode body element are unified.

11 Claims, 9 Drawing Sheets

(51) Int. Cl.
*H01M 50/10* (2021.01)
*H01M 50/60* (2021.01)
*H01M 50/147* (2021.01)
*H01M 50/463* (2021.01)
*H01M 50/531* (2021.01)
*H01M 50/543* (2021.01)

(52) U.S. Cl.
CPC ....... *H01M 50/147* (2021.01); *H01M 50/463* (2021.01); *H01M 50/531* (2021.01); *H01M 50/543* (2021.01); *H01M 50/60* (2021.01)

(58) Field of Classification Search
CPC .. H01M 50/531; H01M 50/543; H01M 10/04; H01M 50/528; H01M 50/54; Y02E 60/10
See application file for complete search history.

(56) References Cited

FOREIGN PATENT DOCUMENTS

| | | | |
|---|---|---|---|
| JP | 2005-32477 A | 2/2005 | |
| JP | 2005-142026 A | 6/2005 | |
| JP | 2005-267945 A | 9/2005 | |
| JP | 2006-228551 A | 8/2006 | |
| JP | 2009-272207 A | 11/2009 | |
| JP | 2011-165515 A | 8/2011 | |
| JP | 2012-94250 A | 5/2012 | |
| JP | 2015-76293 A | 4/2015 | |
| JP | 2015-228359 A | 12/2015 | |
| WO | 2014/054734 A1 | 4/2014 | |
| WO | WO-2016159099 * | 10/2016 | ............ H01M 50/15 |
| WO | WO-2016159099 A1 * | 10/2016 | ............ H01M 50/15 |
| WO | WO-2017094228 * | 6/2017 | ............ H01M 50/10 |
| WO | WO-2017094228 A1 * | 6/2017 | ............ H01M 50/10 |

* cited by examiner

METHOD OF MANUFACTURING SQUARE SECONDARY BATTERY

TECHNICAL FIELD

The present invention relates to a method of manufacturing a square secondary battery.

BACKGROUND ART

Square secondary batteries such as alkaline secondary batteries and nonaqueous electrolyte secondary batteries are used in power sources for driving electric vehicles (EV), hybrid electric vehicles (HEV, PHEV), and the like.

In such square secondary batteries, a battery case is configured of a bottomed cylindrical square outer package including an opening and a sealing plate that seals the opening. The battery case accommodates therein an electrode body including positive electrode plates, negative electrode plates, and separators, and an electrolyte. A positive electrode terminal and a negative electrode terminal are attached to the sealing plate. The positive electrode terminal is electrically connected to the positive electrode plates through a positive electrode collector, and the negative electrode terminal is electrically connected to the negative electrode plates through a negative electrode collector.

The positive electrode plates each include a positive electrode core body made of metal and a positive electrode active material mixture layers formed on the surfaces of the positive electrode core body. A positive electrode core body exposed portion, on which no positive electrode active material mixture layers is formed, is formed in a portion of the positive electrode core body. Furthermore, the positive electrode collector is connected to the positive electrode core body exposed portion. Furthermore, the negative electrode plates each include a negative electrode core body made of metal and negative electrode active material mixture layers formed on the surfaces of the negative electrode core body. A negative electrode core body exposed portion, on which no negative electrode active material mixture layers is formed, is formed in a portion of the negative electrode core body. Furthermore, the negative electrode collector is connected to the negative electrode core body exposed portion.

For example, Patent Literature 1 and Patent Literature 2 disclose disposing of an insulating spacer between an electrode body and a sealing plate.

CITATION LIST

Patent Literature

PTL 1: Japanese Unexamined Patent Application Publication No. 2005-32477
PTL 2: Japanese Unexamined Patent Application Publication No. 2015-76293

SUMMARY OF INVENTION

Technical Problem

In PTL 1 and PTL 2 described above, while disposing of the insulating spacer between the electrode body and the sealing plate is disclosed, further improvement thereof is needed.

A main object of the present invention is to provide a secondary battery that has a high volume energy density and that has a high reliability.

Solution to Problem

A method of manufacturing a square secondary battery according to an aspect of the present invention in which the square secondary battery includes an electrode body that includes a positive electrode plate and a negative electrode plate, an outer package that includes an opening and that houses the electrode body, a sealing plate that seals the opening, a positive electrode tab provided in the positive electrode plate, a negative electrode tab provided in the negative electrode plate, a positive electrode external terminal that is electrically connected to the positive electrode tab and that is attached to the sealing plate, a negative electrode external terminal that is electrically connected to the negative electrode tab and that is attached to the sealing plate, a positive electrode collector member that electrically connects the positive electrode tab and the positive electrode external terminal to each other, a negative electrode collector member that electrically connects the negative electrode tab and the negative electrode external terminal to each other, and an insulating member that is disposed between the sealing plate and the electrode body, the method of manufacturing the square secondary battery including an electrode body element fabricating step in which a first electrode body element including the positive electrode plate and the negative electrode plate, and a second electrode body element including the positive electrode plate and the negative electrode plate are fabricated, a tab-connecting step in which the positive electrode tab of the first electrode body element is connected to the positive electrode collector member, the negative electrode tab of the first electrode body element is connected to the negative electrode collector member, the positive electrode tab of the second electrode body element is connected to the positive electrode collector member, and the negative electrode tab of the second electrode body element is connected to the negative electrode collector member, and an electrode body fabricating step in which, after the tab-connecting step, the first electrode body element and the second electrode body element are unified as one so that the insulating member is disposed between the positive electrode tab of the first electrode body element and the positive electrode tab of the second electrode body element, and between the negative electrode tab of the first electrode body element and the negative electrode tab of the second electrode body element.

With such a configuration, by disposing the insulating member at a predetermined position, an unintentional short-circuiting of the positive and negative electrodes can be prevented. Furthermore, with the method described above, since the insulating member can be disposed in a smaller space, the secondary battery becomes one with a higher volume energy density.

Advantageous Effects of Invention

According to the present invention, a secondary battery that has a higher volume energy density and that has a higher reliability can be provided.

DESCRIPTION OF EMBODIMENTS

A configuration of a square secondary battery 20 according to an embodiment will be described below. Note that the present invention is not limited to the following embodiment.

Figure 1:
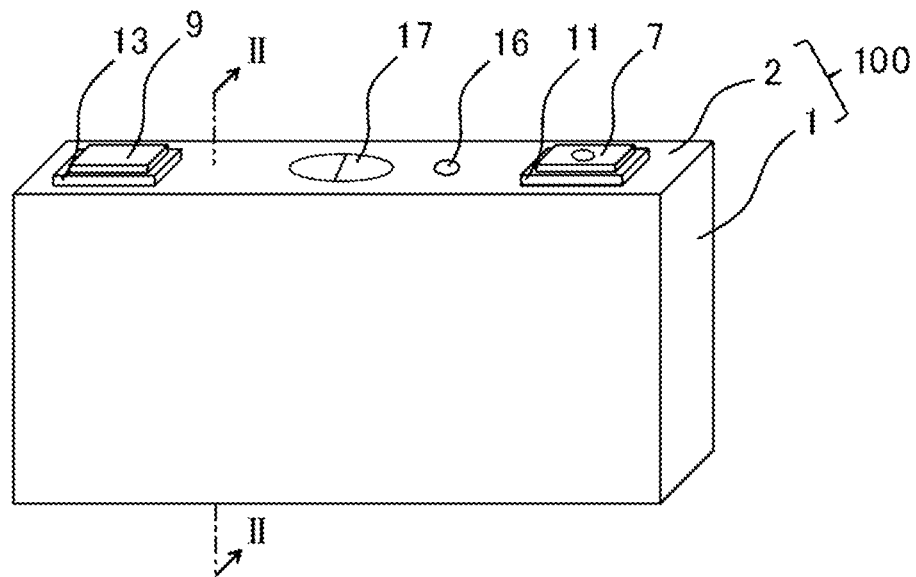
FIG. 1 is a perspective view of a square secondary battery according to an embodiment.
Figure 2:
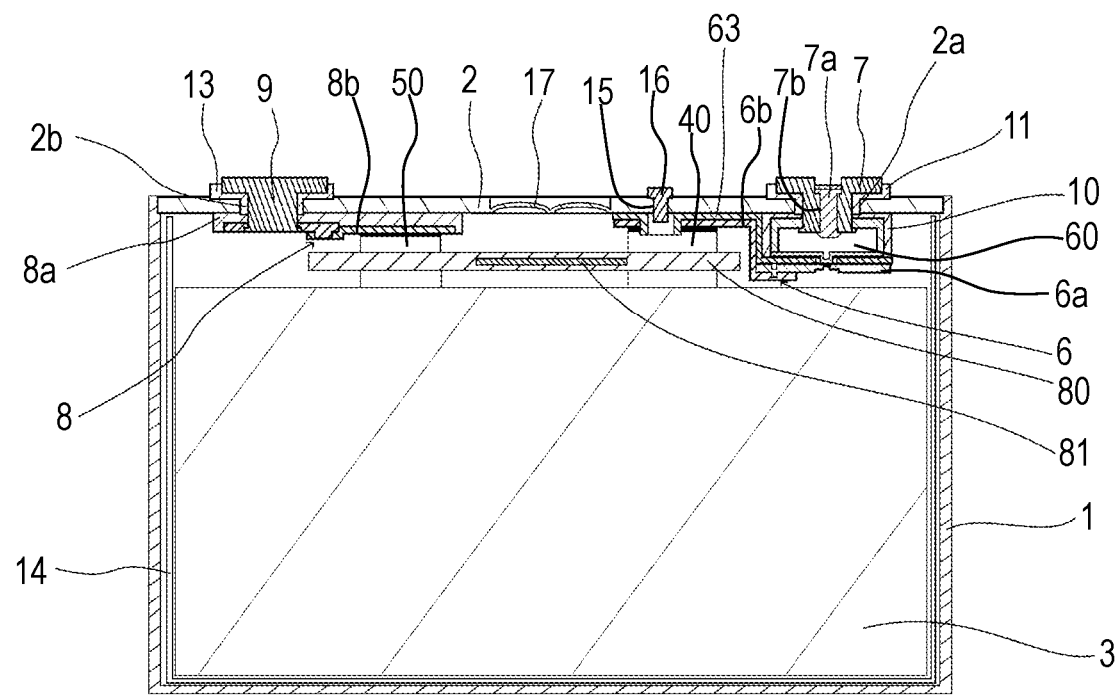
FIG. 2 is a cross-sectional view taken along line II-II in FIG. 1.

FIG. 1 is a perspective view of the square secondary battery 20. FIG. 2 is a cross-sectional view taken along line II-II in FIG. 1. As illustrated in FIGS. 1 and 2, the square secondary battery 20 includes a battery case 100 formed of a bottomed and polygonal-tube-shaped square outer package 1 including an opening, and a sealing plate 2 that seals the opening of the square outer package 1. The square outer package 1 and the sealing plate 2 are, desirably, formed of metal and are, desirably, formed of aluminum or an aluminum alloy, for example. A stacked electrode body 3 in which a plurality of positive electrode plates and a plurality of negative electrode plates are stacked with separators interposed therebetween are housed in the square outer package 1 together with an electrolyte. A resin insulation sheet 14 is disposed between the electrode body 3 and the square outer package 1.

Positive electrode tabs 40 and negative electrode tabs 50 are provided at an end portion of the electrode body 3 on a sealing plate 2 side. The positive electrode tabs 40 are electrically connected to a positive electrode external terminal 7 through a second positive electrode collector 6b and a first positive electrode collector 6a. The negative electrode tabs 50 are electrically connected to a negative electrode external terminal 9 through a second negative electrode collector 8b and a first negative electrode collector 8a. Note that the first positive electrode collector 6a and the second positive electrode collector 6b constitute a positive electrode collector member 6. Furthermore, the first negative electrode collector 8a and the second negative electrode collector 8b constitute a negative electrode collector member 8. Note that the positive electrode collector member 6 may be configured as a single component. Furthermore, the negative electrode collector member 8 may be configured as a single component.

The positive electrode external terminal 7 is fixed to the sealing plate 2 with a resin outer side insulating member 11 interposed therebetween. The negative electrode external terminal 9 is fixed to the sealing plate 2 with a resin outer side insulating member 13 interposed therebetween. The positive electrode external terminal 7 is, desirably, formed of metal and, more desirably, is formed of aluminum or an aluminum alloy. The negative electrode external terminal 9 is, desirably, formed of metal and, more desirably, is formed of copper or a copper alloy. More desirably, the negative electrode external terminal 9 includes a portion formed of copper or a copper alloy on an inner side of the battery case 100 and a portion formed of aluminum or aluminum alloy on an outer side of the battery case 100. Note that nickel plating or the like is, desirably, applied to a surface of the negative electrode external terminal 9.

Desirably, a current breaking mechanism 60 that is actuated when a pressure inside the battery case 100 is equivalent to or higher than a predetermined value and that breaks a conductive path between the positive electrode plates and the positive electrode external terminal 7 is provided in the conductive path between the positive electrode plates and the positive electrode external terminal 7. Note that a current breaking mechanism may be provided in a conductive path between the negative electrode plates and the negative electrode external terminal 9.

A gas discharge valve 17 that breaks when the pressure inside the battery case 100 becomes equivalent to or higher than a predetermined value and that discharges gas inside the battery case 100 to the outside of the battery case 100 is provided in the sealing plate 2. The gas discharge valve 17 is formed thinner than the other parts in the sealing plate 2. Note that the gas discharge valve 17 can be formed by performing press working on the sealing plate 2. Alternatively, the gas discharge valve 17 may be formed by providing a through hole for the gas discharge valve in the sealing plate 2 and closing the through hole with a thin valve. Note that a pressure at which the gas discharge valve 17 is actuated is set larger than a pressure at which the current breaking mechanism 60 is actuated.

An electrolyte injection hole 15 is provided in the sealing plate 2. The electrolyte injection hole 15 is sealed by a sealing plug 16 after an electrolyte is injected inside the battery case 100 through the electrolyte injection hole 15.

A method for manufacturing the square secondary battery 20 will be described next.

[Fabrication of Positive Electrode Plate]

A positive electrode slurry containing lithium-nickel-cobalt-manganese composite oxide as a positive electrode active material, polyvinylidene fluoride (PVdF) as a binding agent, a carbon material as a conductive agent, and N-methylpyrrolidone (NMP) as a dispersion medium is fabricated. The positive electrode slurry is coated on both surfaces of a rectangular aluminum foil that is 15 µm thick and that serves as the positive electrode core body. Subsequently, by drying the above, the N-methylpyrrolidone in the positive electrode slurry is removed and the positive electrode active material mixture layers are formed on the positive electrode core body. Subsequently, a compression process is performed to compress the positive electrode active material mixture layers to a predetermined thickness. The positive electrode plate obtained in the above manner is cut into a predetermined shape.

Figure 3:
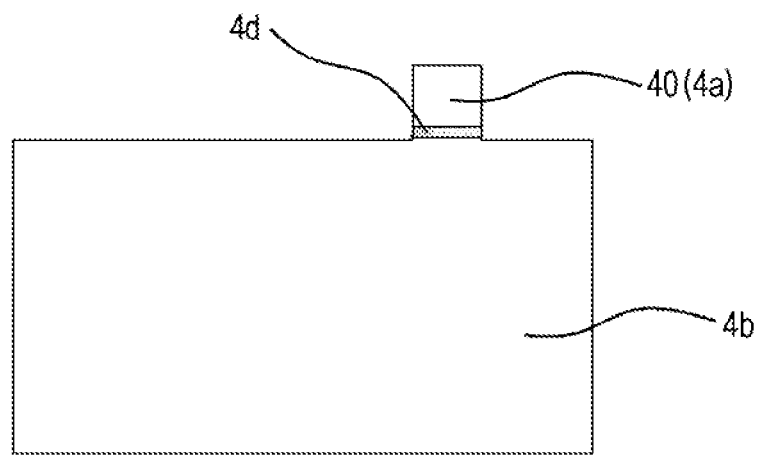
FIG. 3 is a plan view of a positive electrode plate according to the embodiment.

FIG. 3 is a plan view of a positive electrode plate 4 fabricated with the above described method. As illustrated in FIG. 3, the positive electrode plate 4 includes a main body portion in which a positive electrode active material mixture layer 4b is formed on each of the two surfaces of a rectangular positive electrode core body 4a. The positive electrode core body 4a protrudes from an edge of the main body portion. The protruded positive electrode core body 4a constitutes the positive electrode tab 40. Note that the positive electrode tab 40 may be a portion of the positive electrode core body 4a, as illustrated in FIG. 3, or another member may be connected to the positive electrode core body 4a as the positive electrode tab 40. Positive electrode protective layers 4d, each having an electrical resistance that is larger than an electrical resistance of each positive electrode active material mixture layer 4b, are desirably provided in portions in the positive electrode tab 40 adjacent to the positive electrode active material mixture layers 4b. The positive electrode protective layers 4d desirably contain ceramic particles formed of alumina, silica, or zirconia, and binder. Furthermore, the positive electrode protective layers 4d more desirably contains conductive particles formed of a carbon material or the like.

[Fabrication of Negative Electrode Plate]

A negative electrode slurry containing graphite as a negative electrode active material, styrene-butadiene rubber (SBR) as a binding agent, carboxymethyl cellulose (CMC) as a thickener, and water is fabricated. The negative electrode slurry is coated on both surfaces of a rectangular copper foil that is 8 µm thick and that serves as the negative electrode core body. Subsequently, by drying the above, the water in the negative electrode slurry is removed and the negative electrode active material mixture layers are formed on the negative electrode core body. Subsequently, a compression process is performed to compress the negative electrode active material mixture layers to a predetermined thickness. The negative electrode plate obtained in the above manner is cut into a predetermined shape.

Figure 4:
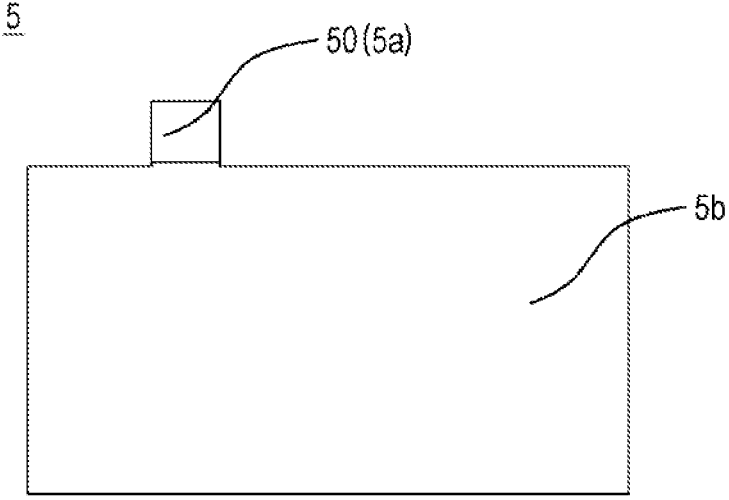
FIG. 4 is a plan view of a negative electrode plate according to the embodiment.

FIG. 4 is a plan view of a negative electrode plates 5 fabricated with the above described method. As illustrated in FIG. 4, the negative electrode plate 5 includes a main body portion in which a negative electrode active material mixture layer 5b is formed on each of the two surfaces of a rectangular negative electrode core body 5a. The negative electrode core body 5a protrudes from an edge of the main body portion. The protruded negative electrode core body 5a constitutes the negative electrode tab 50. Note that the negative electrode tab 50 may be a portion of the negative electrode core body 5a, as illustrated in FIG. 4, or another member may be connected to the negative electrode core body 5a as the negative electrode tab 50.

[Fabrication of Electrode Body Element]

Figure 5:
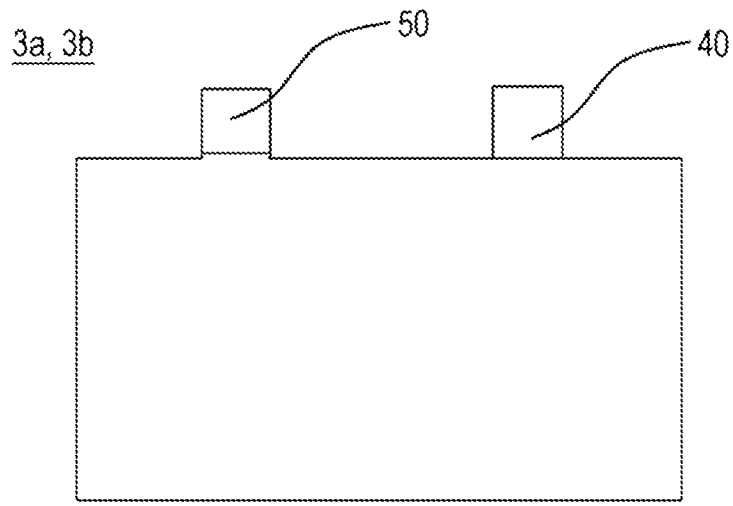
FIG. 5 is a plan view of an electrode body element according to the embodiment.

Stacked electrode body elements (3a and 3b) are fabricated by fabricating 50 positive electrode plates 4 and 51 negative electrode plates 5 with the methods described above and by stacking the above with square polyolefin separators interposed in between. As illustrated in FIG. 5, the stacked electrode body elements (3a and 3b) are fabricated so that, at one end portion, the positive electrode tabs 40 of the positive electrode plates 4 are stacked and the negative electrode tabs 50 of the negative electrode plates 5 are stacked. Separators may be disposed on both outer surfaces of the electrode body elements (3a and 3b) and the electrode plates and the separators may be fixed in a stacked state with a piece of tape or the like. Alternatively, an adhesion layer may be provided on each separator so that the separators and the positive electrode plates 4, and the separators and the negative electrode plates 5 are adhered to each other.

Note that the size of the separator in plan view is, desirably, the same as that of the negative electrode plate 5 or is larger than that of the negative electrode plate 5. Each positive electrode plate 4 may be disposed between two separators and after heat welding the outer peripherals of the separators, the positive electrode plates 4 and the negative electrode plates 5 may be stacked on each other. Note that in fabricating the electrode body elements (3a and 3b), a long separator can be used, and the positive electrode plate 4 and the negative electrode plate 5 may be stacked on each other while the long separator is zigzag folded. Furthermore, a long separator can be used and the positive electrode plate 4 and the negative electrode plate 5 can be stacked on each other while winding the long separator.

[Attaching Components to Sealing Plate]

Referring to FIG. 2, and FIGS. 6 to 8, a method of attaching the positive electrode external terminal 7 and the first positive electrode collector 6a to the sealing plate 2, and a configuration of the current breaking mechanism 60 will be described.

The outer side insulating member 11 is disposed on an outer surface side of a positive electrode terminal attaching hole 2a provided in the sealing plate 2, and an inner side insulating member 10 and a cup-shaped conductive member 61 are disposed on an inner surface side of the positive electrode terminal attaching hole 2a. Subsequently, the positive electrode external terminal 7 is inserted through a through hole of the outer side insulating member 11, the positive electrode terminal attaching hole 2a of the sealing plate 2, a through hole of the inner side insulating member 10, and a through hole of the conductive member 61. Subsequently, a tip of the positive electrode external terminal 7 is riveted on the conductive member 61. With the above, the positive electrode external terminal 7, the outer side insulating member 11, the sealing plate 2, the inner side insulating member 10, and the conductive member 61 are fixed to each other. Note that a portion of the positive electrode external terminal 7 that has been riveted and the conductive member 61 are, desirably, welded to each other by welding or the like. Furthermore, the inner side insulating member 10 and the outer side insulating member 11 are, desirably, each formed of resin.

The conductive member 61 has an opening portion on an electrode body 3 side. A disk-shaped deformation plate 62 is disposed so as to close the opening portion of the conductive member 61, and a peripheral edge of the deformation plate 62 is connected to the conductive member 61 by welding. With the above, the opening portion of the conductive member 61 is sealed by the deformation plate 62. Note that each of the conductive member 61 and the deformation plate 62 are, desirably, formed of metal and, more desirably, are formed of aluminum or an aluminum alloy.

Subsequently, a third insulating member 63 formed of resin is disposed on the electrode body 3 side of the deformation plate 62. Desirably, the third insulating member 63 includes a connection portion and the connection portion is connected to the inner side insulating member 10. Furthermore, desirably, a claw-shaped hooking and fixing portion is provided in the third insulating member 63, a flange portion, a recessed portion, or a protruded portion is provided in the conductive member 61, and the hooking and fixing portion of the third insulating member 63 is fixed to the flange portion, the recessed portion, or the protruded portion of the conductive member 61.

Fixing projections are formed on a surface of the third insulating member 63 on the electrode body 3 side. Furthermore, desirably, the third insulating member 63 includes an insulating member first area 63x disposed below the deformation plate 62, an insulating member second area 63y that extends towards the sealing plate 2 from an end portion of the insulating member first area 63x, and an insulating member third area 63z that extends along the sealing plate 2 from an end portion of the insulating member second area 63y. An insulating member opening 63b is provided in the insulating member third area 63z at a position opposing the electrolyte injection hole 15 of the sealing plate 2. Furthermore, an insulating member projection 63c that projects towards the electrode body 3 is provided in an edge portion of the insulating member opening 63b.

Figure 6:
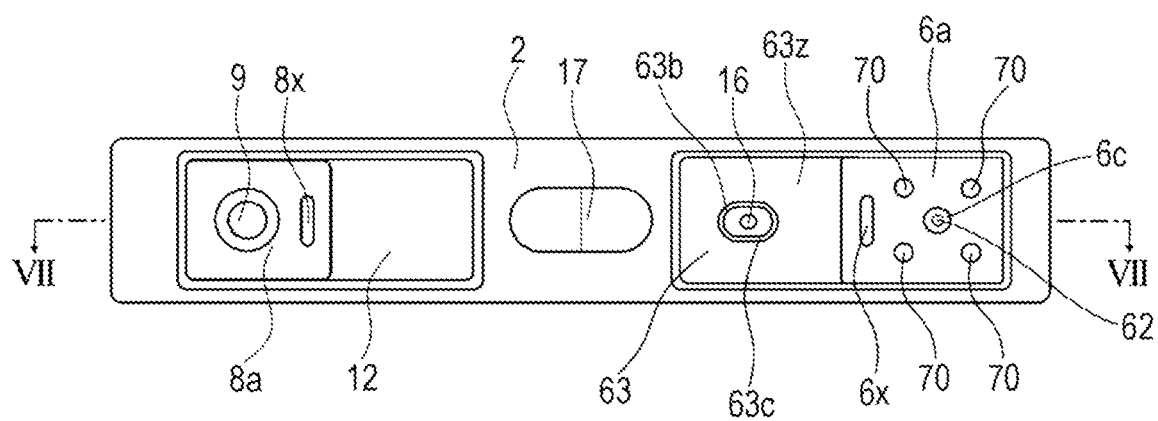
FIG. 6 is a bottom view of a sealing plate after components have been mounted.

Subsequently, the first positive electrode collector 6a is disposed on the electrode body 3 side of the third insulating member 63. The first positive electrode collector 6a includes fixing through holes. Subsequently, the fixing projections of the third insulating member 63 are inserted into the fixing through holes of the first positive electrode collector 6a, a diameter of a distal end of each fixing projection is enlarged, and the third insulating member 63 and the first positive electrode collector 6a are fixed to each other. With the above, fixed portions 70 are formed. As illustrated in FIG. 6, the fixed portions 70 are, desirably, provided at four portions so as to surround the portion connecting the deformation plate 62 and the first positive electrode collector 6a to each other.

Subsequently, the deformation plate 62 and the first positive electrode collector 6a are connected to each other by welding through a through hole provided in the third insulating member 63. Note that desirably, the first positive electrode collector 6a includes a thin wall portion 6c and is connected to the deformation plate 62 by welding at the thin wall portion 6c. Desirably, an opening is provided in the middle of the thin wall portion 6c, and an edge portion of the opening is connected to the deformation plate 62 by welding. Furthermore, more desirably, an annular notch is provided in the thin wall portion 6c so as to surround the portion connecting the first positive electrode collector 6a and the deformation plate 62 to each other.

When a pressure inside the battery case 100 becomes equivalent to or higher than a predetermined value, the deformation plate 62 becomes deformed so that a middle portion of the deformation plate 62 moves upwards (towards a positive electrode external terminal 7 side). With the deformation of the deformation plate 62, the thin wall portion 6c of the first positive electrode collector 6a becomes broken. With the above, the conductive path between the positive electrode plates 4 and the positive electrode external terminal 7 becomes disconnected.

Note that a leak check of the portion connecting the conductive member 61 and the deformation plate 62 to each other can be conducted by providing a terminal through hole 7b in the positive electrode external terminal 7 and by having gas flow inside the current breaking mechanism 60 through the terminal through hole 7b. Furthermore, the deformation plate 62 and the first positive electrode collector 6a can be connected to each other by welding while the deformation plate 62 is pushed against the first positive electrode collector 6a with the gas. Ultimately, the terminal through hole 7b is sealed by a terminal sealing member 7a. Desirably, the terminal sealing member 7a includes a metal member 7x and a rubber member 7y.

The first positive electrode collector 6a includes a collector projection 6x on a surface on the electrode body 3 side.

Referring to FIGS. 2, 6, 7, and 9, a method of attaching the negative electrode external terminal 9 and the first negative electrode collector 8a to the sealing plate 2 will be described.

The outer side insulating member 13 is disposed on an outer surface side of a negative electrode terminal attaching hole 2b provided in the sealing plate 2, and an inner side insulating member 12 and the first negative electrode collector 8a are disposed on an inner surface side of the negative electrode terminal attaching hole 2b. Subsequently, the negative electrode external terminal 9 is inserted through a through hole of the outer side insulating member 13, the negative electrode terminal attaching hole 2b of the sealing plate 2, a through hole of the inner side insulating member 12, and a through hole of the first negative electrode collector 8a. Subsequently, a tip of the negative electrode external terminal 9 is riveted on the first negative electrode collector 8a. With the above, the outer side insulating member 13, the sealing plate 2, the inner side insulating member 12, and the first negative electrode collector 8a are fixed to each other. Note that a portion of the negative electrode external terminal 9 that has been riveted and the first negative electrode collector 8a are, desirably, welded to each other by laser welding or the like. Furthermore, the inner side insulating member 12 and the outer side insulating member 13 are, desirably, each formed of a resin.

[Connecting Second Collector and Tab to Each Other]

Figure 10:
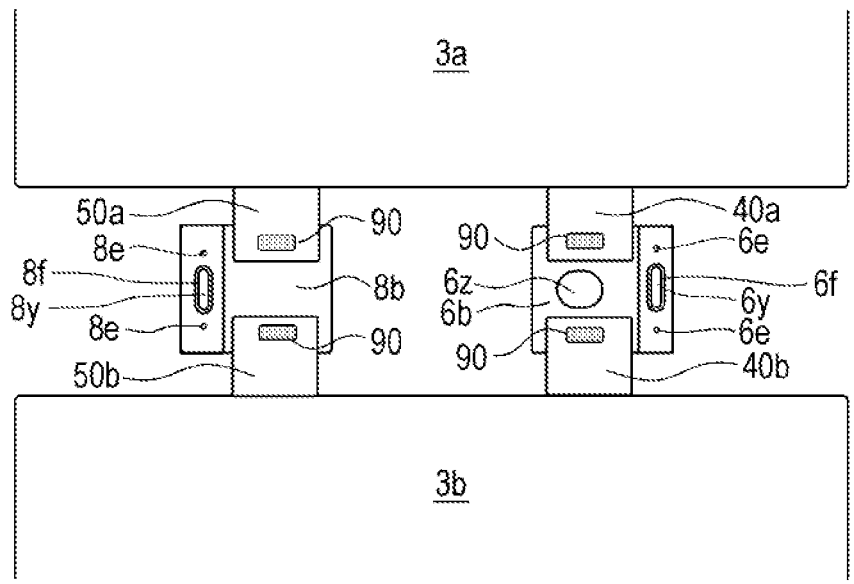
FIG. 10 is a diagram illustrating a step of connecting tabs to a second collector.

FIG. 10 is a diagram illustrating a method of connecting the positive electrode tabs 40 to the second positive electrode collector 6b, and a method of connecting the negative electrode tabs 50 to the second negative electrode collector 8b. Two electrode body elements are fabricated with the method described above. The electrode body elements are referred to as the first electrode body element 3a and the second electrode body element 3b. Note that the first electrode body element 3a and the second electrode body element 3b may have the same configuration or may have different configurations. Note that the plurality of positive electrode tabs 40 of the first electrode body element 3a constitute a first positive electrode tab group 40a. The plurality of negative electrode tabs 50 of the first electrode body element 3a constitute a first negative electrode tab group 50a. The plurality of positive electrode tabs 40 of the second electrode body element 3b constitute a second positive electrode tab group 40b. The plurality of negative electrode tabs 50 of the second electrode body element 3b constitute a second negative electrode tab group 50b.

The second positive electrode collector 6b and the second negative electrode collector 8b are disposed between the first electrode body element 3a and the second electrode body element 3b. Subsequently, the first positive electrode tab group 40a formed of the plurality of layered positive electrode tabs 40 protruding from the first electrode body element 3a is disposed on the second positive electrode collector 6b, and the first negative electrode tab group 50a formed of the plurality of layered negative electrode tabs 50 protruding from the first electrode body element 3a is disposed on the second negative electrode collector 8b. Furthermore, the second positive electrode tab group 40b formed of the plurality of layered positive electrode tabs 40 protruding from the second electrode body element 3b is disposed on the second positive electrode collector 6b, and the second negative electrode tab group 50b formed of the layered negative electrode tabs 50 protruding from the second electrode body element 3b is disposed on the second negative electrode collector 8b. The first positive electrode tab group 40a and the second positive electrode tab group 40b are connected to the second positive electrode collector 6b by welding and welded connection portions 90 are formed. The first negative electrode tab group 50a and the second negative electrode tab group 50b are connected to the second negative electrode collector 8b by welding and the welded connection portions 90 are formed. Connecting by welding can be performed in the following manner.

The layered tabs (the first positive electrode tab group 40a, the second positive electrode tab group 40b, the first negative electrode tab group 50a, and the second negative electrode tab group 50b) and the collectors (the second positive electrode collector 6b and the second negative electrode collector 8b) are held by welding jigs from above and below and welding is performed. Note that the welding method is, desirably, ultrasonic welding or resistance welding. With the above, the layered tabs and the collectors are reliably connected by welding. In a case in which the number of layered tabs is large, for example, in a case in which the number of layers is 20 or more, compared with laser welding or the like, ultrasonic welding or resistance welding can form a more reliable welded connection portion since welding can be performed while interposing with a pair of welding jigs. Note that the pair of welding jigs are a pair of electrodes for resistance welding in a case of resistance welding and are a horn and an anvil in a case of ultrasonic welding. Note that connecting between the tabs (the first positive electrode tab group 40a, the second positive electrode tab group 40b, the first negative electrode tab group 50a, and the second negative electrode tab group 50b) and the collectors (the second positive electrode collector 6b and the second negative electrode collector 8b) can be performed by laser welding as well.

In the second positive electrode collector 6b, the first positive electrode tab group 40a of the first electrode body element 3a is connected on a first side with respect to a middle portion of the second positive electrode collector 6b in a width direction. In the second positive electrode collector 6b, the second positive electrode tab group 40b of the second electrode body element 3b is connected on a second side with respect to the middle portion of the second positive electrode collector 6b in the width direction.

In the second negative electrode collector 8b, the first negative electrode tab group 50a of the second electrode body element 3b is connected on the first side with respect to a middle portion of the second negative electrode collector 8b in the width direction. In the second positive electrode collector 6b, the second negative electrode tab group 50b of the second electrode body element 3b is connected on the second side with respect to the middle portion of the second positive electrode collector 6b in the width direction.

As illustrated in FIG. 10, an opening portion 6z is provided in the second positive electrode collector 6b. After connecting the second positive electrode collector 6b to the first positive electrode collector 6a, the opening portion 6z is disposed at a position corresponding to the electrolyte injection hole 15 provided in the sealing plate 2. Furthermore, the first positive electrode tab group 40a of the first electrode body element 3a is, with respect to the opening portion 6z, connected on the first side in the width direction of the second positive electrode collector 6b. Furthermore, the second positive electrode tab group 40b of the second electrode body element 3b is, with respect to the opening portion 6z, connected on the second side in the width direction of the second positive electrode collector 6b. When the second positive electrode collector 6b, the first positive electrode tab group 40a, and the second positive electrode tab group 40b are viewed in a direction perpendicular to the sealing plate 2, desirably, portions of the first positive electrode tab group 40a and the second positive electrode tab group 40b that are disposed substantially parallel to the second positive electrode collector 6b do not overlap the opening portion 6z. With the above, the second positive electrode collector 6b, the first positive electrode tab group 40a, and the second positive electrode tab group 40b can be prevented from interrupting the injection of the electrolyte.

Note that either of the step of fixing the first positive electrode collector 6a and the first negative electrode collector 8a to the sealing plate 2 and the step of connecting the positive electrode tabs 40 and the negative electrode tabs 50 to the second positive electrode collector 6b and the second negative electrode collector 8b can be performed first.

[Connecting First Positive Electrode Collector and Second Positive Electrode Collector to Each Other]

Figure 7:
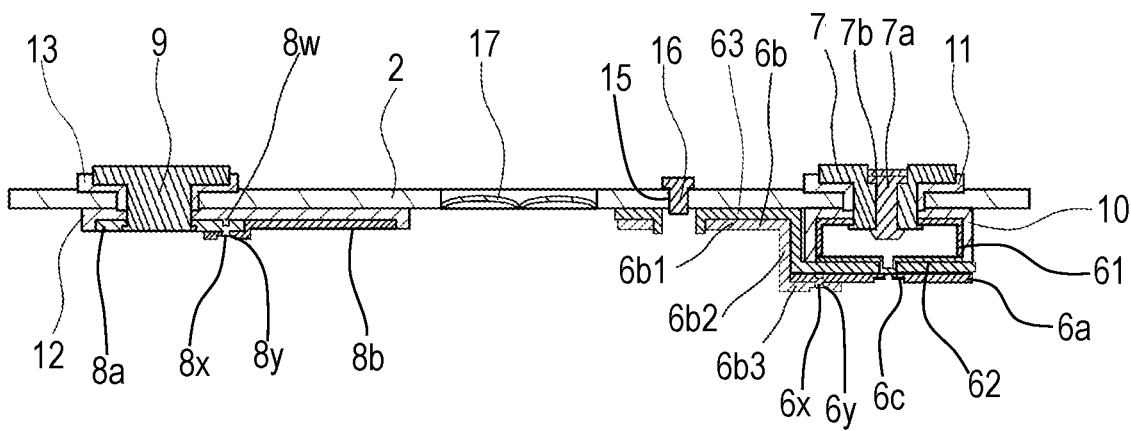
FIG. 7 is a cross-sectional view taken along line VII-VII in FIG. 6.
Figure 8:
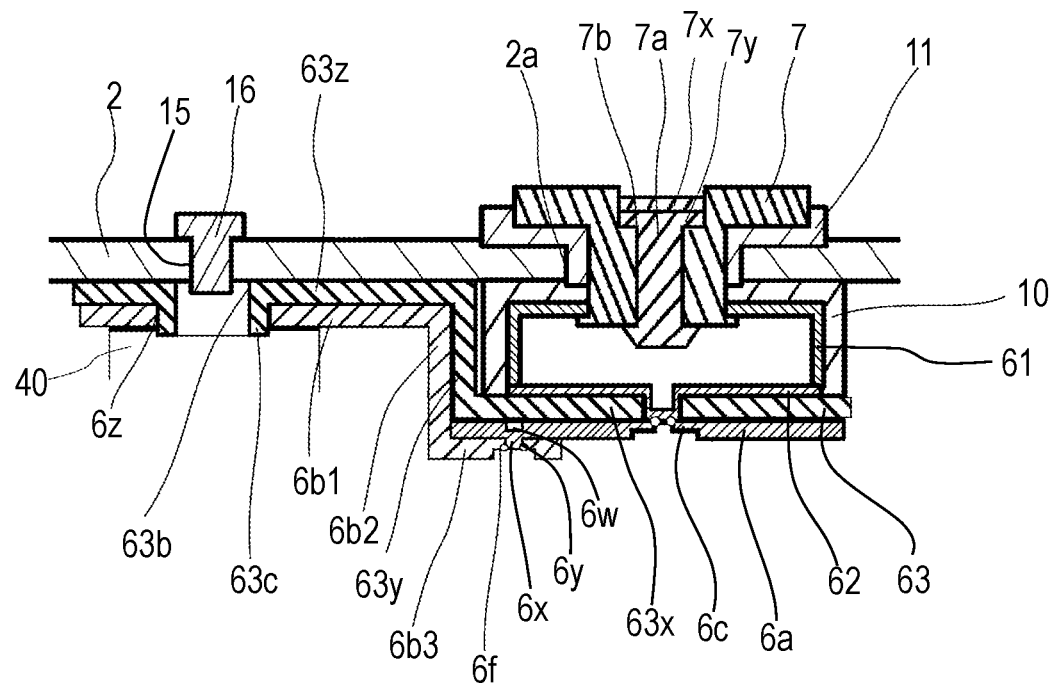
FIG. 8 is an enlarged view of a vicinity of a first positive electrode collector, a second positive electrode collector, and a current breaking mechanism in FIG. 7.

As illustrated in FIGS. 6 and 7, the first positive electrode collector 6a is provided with the collector projection 6x. Furthermore, as illustrated in FIG. 10, a collector opening 6y is provided in the second positive electrode collector 6b. As illustrated in FIGS. 7 and 8, the second positive electrode collector 6b is disposed on the third insulating member 63 so that the collector projection 6x of the first positive electrode collector 6a is positioned inside the collector opening 6y of the second positive electrode collector 6b. Subsequently, edge portions of the collector projection 6x of the first positive electrode collector 6a and the collector opening 6y of the second positive electrode collector 6b are welded to each other by projecting an energy ray such as a laser. With the above, the first positive electrode collector 6a and the second positive electrode collector 6b are connected to each other. Note that a collector first recessed portion 6f is provided around the collector opening 6y of the second positive electrode collector 6b. In other words, the collector opening 6y is formed in the middle of the collector first recessed portion 6f. The first positive electrode collector 6a and the second positive electrode collector 6b are connected to each other by welding in the collector first recessed portion 6f.

As illustrated in FIG. 8, the second positive electrode collector 6b includes a collector first area 6b1, a collector second area 6b2, and a collector third area 6b3. The positive electrode tabs 40 are connected to the collector first area 6b1. The first positive electrode collector 6a is connected to the collector third area 6b3. The collector second area 6b2 connects the collector first area 6b1 and the collector third area 6b3 to each other. Furthermore, in the direction perpendicular to the sealing plate 2, a distance between the sealing plate 2 and the collector first area 6b1 is smaller than a distance between the sealing plate 2 and the collector third area 6b3. With such a configuration, the space occupied by collector portions can be decreased and the square secondary battery becomes one with a higher volume energy density.

As illustrated in FIG. 10, target holes 6e are provided in the second positive electrode collector 6b on both sides of the collector opening 6y. When the first positive electrode collector 6a and the second positive electrode collector 6b are welded to each other by projecting an energy ray such as a laser, desirably, the target holes 6e are targets for image correction. Desirably, images of the target holes 6e are detected, position correction is performed, and an energy ray is projected along the shape of the collector opening 6y. Note that rather than being through holes, the target holes 6e can be recessed portions. Desirably, an area of the target holes 6e in plan view is smaller than an area of the collector opening 6y in plan view. Furthermore, in the width direction of the second positive electrode collector 6b, desirably, the collector opening 6y and the target holes 6e are disposed on a straight line.

As illustrated in FIG. 8, a collector second recessed portion 6w is formed on a surface of the first positive electrode collector 6a that opposes the third insulating member 63 and on a back side of the collector projection 6x. It is desirable since, with the above, a larger welded connection portion can be readily formed between the first positive electrode collector 6a and the second positive electrode collector 6b. Furthermore, owing to the formation of the collector second recessed portion 6w, the third insulating member 63 can be prevented from being damaged by heat during welding when the first positive electrode collector 6a and the second positive electrode collector 6b are connected to each other by welding.

As illustrated in FIG. 8, desirably, a distal end of the insulating member projection 63c of the third insulating member 63 on the lower side (the electrode body 3 side) protrudes to the lower side (the electrode body 3 side) with respect to an underside of the second positive electrode collector 6b around the opening portion 6z. With the above, the sealing plug 16 and the second positive electrode collector 6b can be reliably prevented from coming in contact with each other. Note that the insulating member projection 63c is, desirably, annular. However, the insulating member projection 63c does not necessarily have to be annular and may have a partially cut away shape.

[Connecting First Negative Electrode Collector and Second Negative Electrode Collector to Each Other]

Figure 9:
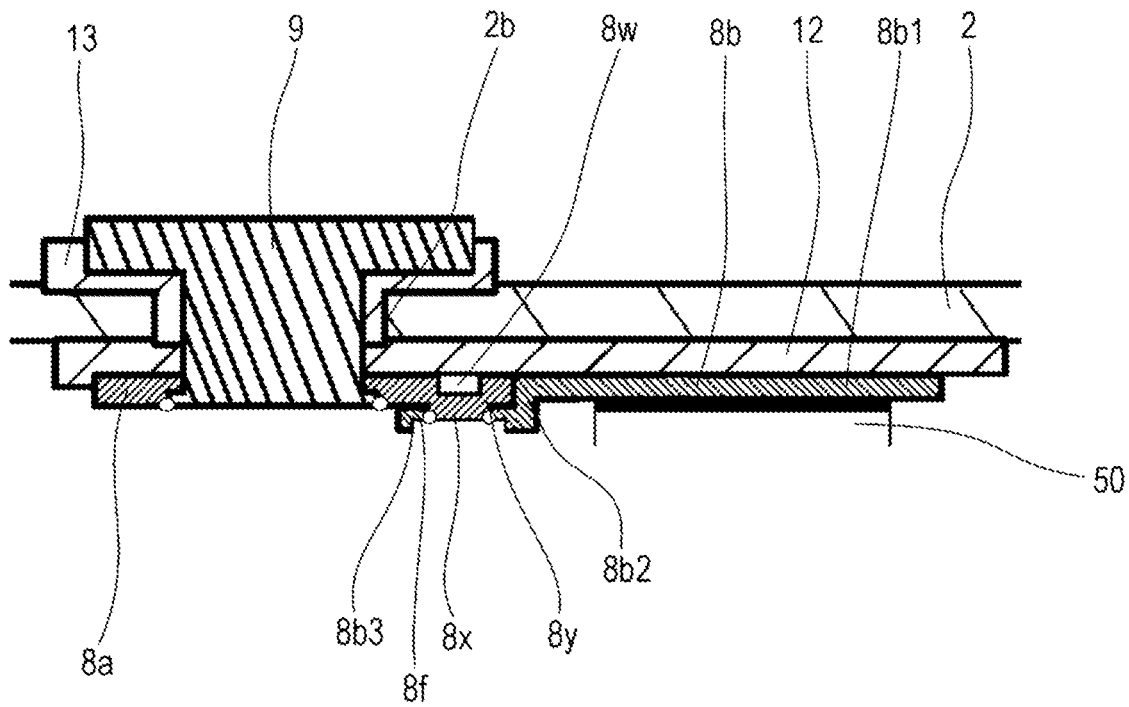
FIG. 9 is an enlarged view of a vicinity of the first negative electrode collector and the second negative electrode collector in FIG. 7.

As illustrated in FIGS. 6 and 7, the first negative electrode collector 8a is provided with a collector projection 8x. Furthermore, as illustrated in FIGS. 9 and 10, the second negative electrode collector 8b is provided with a collector opening 8y. As illustrated in FIG. 9, the second negative electrode collector 8b is disposed on the inner side insulating member 12 so that the collector projection 8x of the first negative electrode collector 8a is positioned inside the collector opening 8y of the second negative electrode collector 8b. Subsequently, edge portions of the collector projection 8x of the first negative electrode collector 8a and the collector opening 8y of the second negative electrode collector 8b are welded to each other by projecting an energy ray such as a laser. With the above, the first negative electrode collector 8a and the second negative electrode collector 8b are connected to each other. Note that as illustrated in FIG. 10, a collector first recessed portion 8f is provided around the collector opening 8y of the second negative electrode collector 8b. In other words, the collector opening 8y is formed in the middle of the collector first recessed portion 8f. The first negative electrode collector 8a and the second negative electrode collector 8b are connected to each other by welding in the collector first recessed portion 8f. Furthermore, similar to the second positive electrode collector 6b, target holes 8e are provided in the second negative electrode collector 8b.

As illustrated in FIG. 9, a collector second recessed portion 8w is formed on a surface of the first negative electrode collector 8a that opposes the inner side insulating member 12 and on a back side of the collector projection 8x. It is desirable since, with the above, a larger welded connection portion can be readily formed between the first negative electrode collector 8a and the second negative electrode collector 8b. Furthermore, owing to the formation of the collector second recessed portion 8w, the inner side insulating member 12 can be prevented from being damaged by heat during welding when the first negative electrode collector 8a and the second negative electrode collector 8b are connected to each other by welding.

As illustrated in FIG. 9, the second negative electrode collector 8b includes a collector first area 8b1, a collector second area 8b2, and a collector third area 8b3. The negative electrode tabs 50 are connected to the collector first area 8b1. The first negative electrode collector 8a is connected to the collector third area 8b3. The collector second area 8b2 connects the collector first area 8b1 and the collector third area 8b3 to each other. Furthermore, in the direction perpendicular to the sealing plate 2, a distance between the sealing plate 2 and the collector first area 8b1 is smaller than a distance between the sealing plate 2 and the collector third area 8b3. With such a configuration, the space occupied by collector portions can be decreased and the square secondary battery becomes one with a higher volume energy density.

Note that each of the collector projection 6x and the collector projection 8x are, desirably, not a perfect circle and are, desirably, square, elliptical, or track shaped.

<Connecting First Insulating Member and Second Insulating Member to Each Other>

Desirably, a first insulating member and a second insulating member are connected after, as described above, electrically connecting the positive electrode tabs 40 and the positive electrode external terminal 7 to each other and electrically connecting the negative electrode tabs 50 and the negative electrode external terminal 9 to each other.

Figure 11:
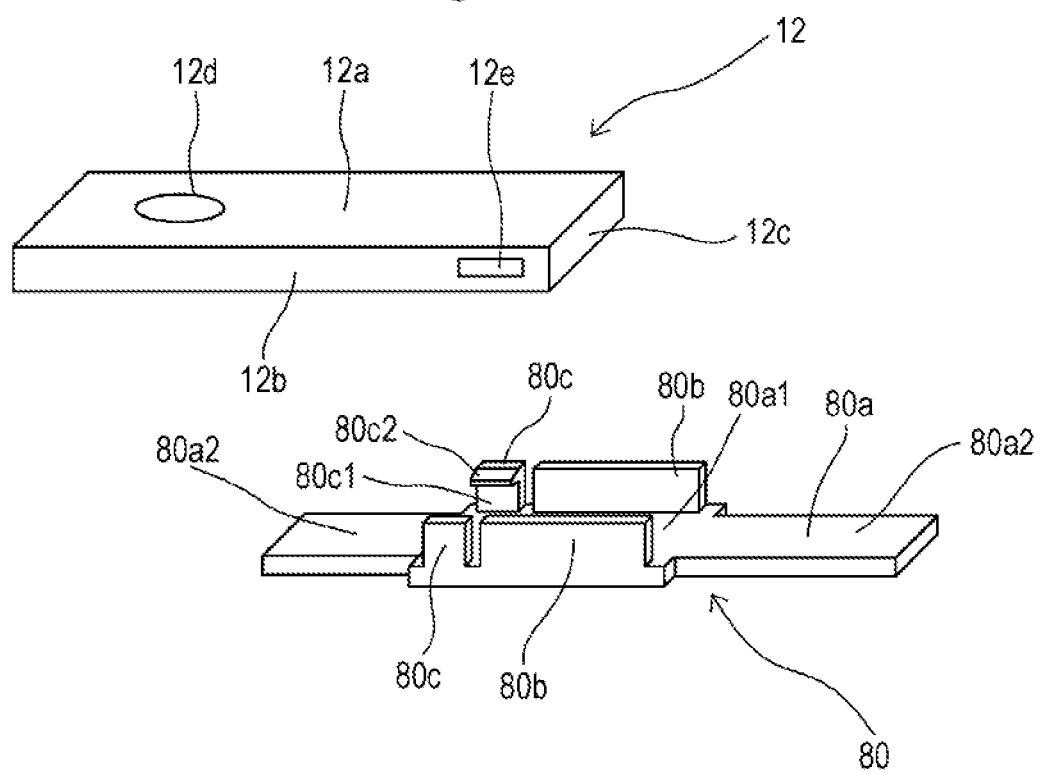
FIG. 11 is a perspective view of the first insulating member and the second insulating member.

FIG. 11 is a perspective view of the inner side insulating member 12 serving as the first insulating member, and a second insulating member 80. The inner side insulating member 12 includes a first insulating member main body portion 12a that opposes an inner surface of the sealing plate 2. Desirably, the first insulating member main body portion 12a is plate shaped. The first insulating member main body portion 12a includes a through hole 12d, and the negative electrode external terminal 9 is inserted in the through hole 12d. A pair of first sidewalls 12b that protrude towards the electrode body 3 are provided at both ends of the first insulating member main body portion 12a of the inner side insulating member 12 in a short direction. A recessed portion 12e for connection is provided in an outer surface of each of the pair of first sidewalls 12b. Furthermore, a pair of second sidewalls 12c that protrude towards the electrode body 3 are provided at both ends of the first insulating member main body portion 12a of the inner side insulating member 12 in a longitudinal direction.

The second insulating member 80 includes a second insulating member main body portion 80a disposed so as to oppose the sealing plate 2. The second insulating member main body portion 80a is disposed between the sealing plate 2 and the electrode body 3. In the longitudinal direction of the sealing plate 2, the second insulating member main body portion 80a includes, in the middle thereof, a wide-width portion 80a1 and, on both sides of the wide-width portion 80a1, narrow-width portions 80a2 that has a width that is smaller than a width of the wide-width portion 80a1. A pair of sidewalls 80b that extend from the second insulating member main body portion 80a towards the sealing plate 2 are provided at both ends of the wide-width portion 80a1 of the second insulating member main body portion 80a in the short direction of the sealing plate 2. Furthermore, a pair of connection portions 80c that extend from the second insulating member main body portion 80a towards the sealing plate 2 are provided at both ends of the wide-width portion 80a1 of the second insulating member main body portion 80a in the short direction of the sealing plate 2. Note that each sidewall 80b and the corresponding connection portion 80c are provided with a gap in between in the longitudinal direction of the sealing plate 2. With the above, since the pair of connection portions 80c can be readily deformed, when the connection portions 80c are connected to the inner side insulating member 12 serving as the first insulating member, the second insulating member 80 can be reliably prevented from being damaged or broken.

Upper ends of the sidewalls 80b are, desirably, in contact with the inner surface of the sealing plate 2. Note that a height of each sidewall 80b (a length from the second insulating member main body portion 80a to the upper end of each sidewall 80b) can be larger than a height of each connection portion 80c (a length from the second insulating member main body portion 80a to an upper end of each connection portion 80c).

Figure 12:
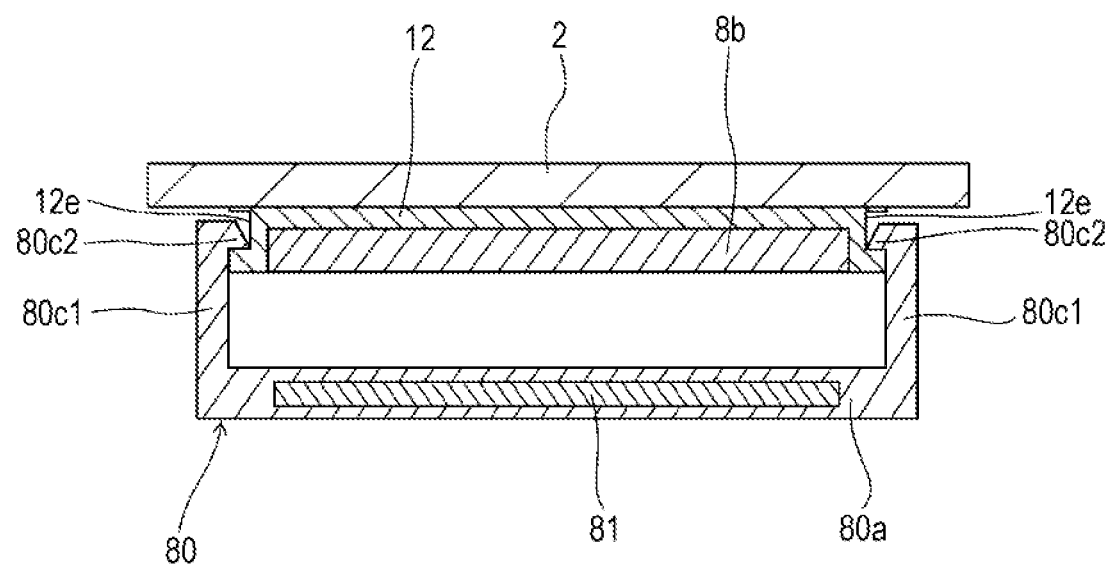
FIG. 12 is a cross-sectional view of a vicinity of a portion connecting the first insulating member and the second insulating member to each other, taken in a short direction of the sealing plate.

FIG. 12 is a cross-sectional view of a vicinity of a portion connecting the inner side insulating member 12 serving as the first insulating member, and the second insulating member 80 to each other, which is taken in the short direction of the sealing plate. The connection portions 80c of the second insulating member 80 each include a vertical wall 80c1 that extends from the second insulating member main body portion 80a of the second insulating member 80 towards the sealing plate 2, and a projection 80c2 that projects from inner lateral surface of the vertical wall 80c1 towards the inner side insulating member 12 serving as the first insulating member. Furthermore, the above projections 80c2 are fitted to the recessed portions 12e for connection of the inner side insulating member 12 serving as the first insulating member. With the above, the inner side insulating member 12 serving as the first insulating member and the second insulating member 80 are connected to each other. Note that recessed portions for connection may be provided in end portions of the first sidewalls 12b of the inner side insulating member 12 serving as the first insulating member on the sealing plate 2 side, and projections 80c2 may be disposed between the inner side insulating member 12 serving as the first insulating member and the sealing plate 2.

Desirably, a metal plate 81 serving as a shielding member is disposed in the second insulating member 80 at a position opposing the gas discharge valve 17 provided in the sealing plate 2.

Figure 13:
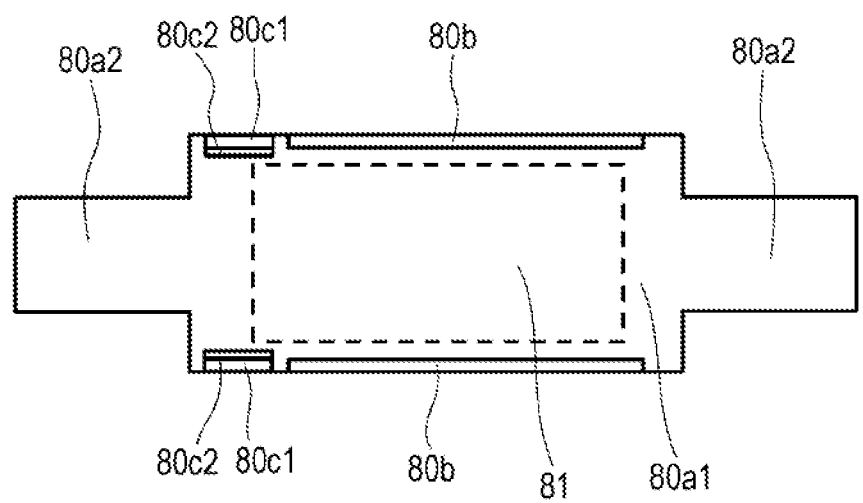
FIG. 13 is a top view of the second insulating member.

FIG. 13 is a top view of the second insulating member 80. Note that the broken line in FIG. 13 indicates an outer peripheral edge of the metal plate 81. In the second insulating member 80, the metal plate 81 is molded inside the second insulating member 80 made of resin.

The metal plate 81 is, desirably, formed of iron, an iron alloy such as stainless steel, copper, a copper alloy, aluminum, an aluminum alloy, or the like. Note that the melting point of the metal plate 81 is, desirably, higher than the melting point of the sealing plate 2. For example, desirably, the sealing plate 2 is formed of aluminum or an aluminum alloy, and the metal plate 81 is formed of stainless steel.

<Fabrication of Electrode Body>

The first positive electrode tab group 40a, the second positive electrode tab group 40b, the first negative electrode tab group 50a, and the second negative electrode tab group 50b are curved so that an upper surface of the first electrode body element 3a and an upper surface of the second electrode body element 3b illustrated in FIG. 10 are in contact with each other directly or with another member interposed therebetween. With the above, the first electrode body element 3a and the second electrode body element 3b are unified as a single electrode body 3. Note that the first electrode body element 3a and the second electrode body element 3b are, desirably, unified as one with a piece of tape or the like. Alternatively, the first electrode body element 3a and the second electrode body element 3b are unified as one by being disposed inside the insulation sheet 14 formed in a box shape or a bag shape.

<Assembling Square Secondary Battery>

The electrode body 3 that is attached to the sealing plate 2 is covered with the insulation sheet 14 and is inserted into the square outer package 1. Note that the insulation sheet 14 is, desirably, an insulation sheet bent and formed into a box shape or a bag shape. Subsequently, the sealing plate 2 and the square outer package 1 are adhered to each other by laser welding or the like and the opening of the square outer package 1 is sealed. After the above, a nonaqueous electrolyte solution containing an electrolyte solvent and electrolyte salt is injected through the electrolyte injection hole 15 provided in the sealing plate 2. Subsequently, the electrolyte injection hole 15 is sealed with the sealing plug 16.

<About Square Secondary Battery 20>

In the square secondary battery 20, the second insulating member 80 is connected to the inner side insulating member 12 serving as the first insulating member fixed to the sealing plate 2. Accordingly, the second insulating member 80 can be suppressed from moving greatly inside the battery case 100 when a vibration or an impact is applied to the square secondary battery 20. Accordingly, unexpected short-circuiting that may be caused by positional displacement of the second insulating member 80 can be prevented reliably. Alternatively, the second insulating member 80 can be prevented from moving inside the battery case 100 and damaging the positive electrode tabs 40 or the negative electrode tabs 50.

Note that, desirably, one of the narrow-width portions 80a2 of the second insulating member 80 is disposed between the first positive electrode tab group 40a and the second positive electrode tab group 40b, and the other one of the narrow-width portions 80a2 of the second insulating member 80 is disposed between the first negative electrode tab group 50a and the second negative electrode tab group 50b. Furthermore, in the longitudinal direction of the sealing plate 2, desirably, the wide-width portion 80a1 of the second insulating member 80 is disposed between the first positive electrode tab group 40a and the second positive electrode tab group 40b, and the first negative electrode tab group 50a and the second negative electrode tab group 50b. With such a configuration, the second insulating member 80 can be reliably prevented from damaging the tabs. Note that the second insulating member 80 do not necessarily need to have the wide-width portion and the narrow-width portions.

The pair of sidewalls 80b that extend from the second insulating member main body portion 80a towards the sealing plate 2 are provided at both ends of the wide-width portion 80a1 of the second insulating member main body portion 80a of the second insulating member 80 in the short direction of the sealing plate 2. With such a configuration, a flow path of gas can be reliably secured between the second insulating member main body portion 80a of the second insulating member 80 and the sealing plate 2. In other words, the second insulating member main body portion 80a can be prevented from closing the gas discharge valve 17 in a more reliable manner. Accordingly, the second insulating member 80 can be prevented from interrupting the discharge of gas from the gas discharge valve 17. Furthermore, the second insulating member 80 can be prevented from coming in contact with the gas valve.

In the longitudinal direction of the sealing plate 2, a length of each sidewall 80b is, desirably, shorter than a length of the second insulating member main body portion 80a. With the above, in a case in which the gas discharge valve 17 is actuated, the gas generated in the electrode body 3 can be discharged smoothly to a portion external to the battery case 100.

Desirably, a metal plate 81 is disposed in the second insulating member 80 at a position opposing the gas discharge valve 17 provided in the sealing plate 2. With the above, in a case in which abnormality occurs in the square secondary battery 20, a high-temperature gas blown out from the electrode body 3 can be suppressed from being directly blown against the gas discharge valve 17. With the above, in a case in which the gas discharge valve 17 is broken, a high-temperature gas and sparks can be prevented from blowing out from the gas discharge valve 17. Note that it is practically desirable that the metal plate 81 is formed of stainless steel.

A method of attaching the metal plate 81 to the second insulating member 80 is not limited in particular. Attachment may be performed by adhering, fitting, or the like to an upper surface (a surface on the sealing plate 2 side) or the underside (a surface on the electrode body 3 side) of the second insulating member 80. Furthermore, as illustrated in FIGS. 2 and 12, the metal plate 81 may be disposed inside the second insulating member 80 formed of resin. With such a configuration, an unexpected short-circuiting of the positive and negative electrodes through the metal plate 81 can be prevented in a more reliable manner. Note that molding is desirable as a method of disposing the metal plate 81 inside the resin second insulating member 80.

In the square secondary battery 20, the second insulating member 80 holding the metal plate 81 is connected to the inner side insulating member 12 serving as the first insulating member fixed to the sealing plate 2. Accordingly, the position of the metal plate 81 can be reliably disposed at a predetermined position and the positional displacement of the metal plate 81 can be suppressed. Accordingly, blowing out of the high-temperature gas, sparks, and the like from the gas discharge valve 17 can be suppressed in a further reliable manner. Furthermore, since the sidewalls 80b are provided in the second insulating member, an unexpected short-circuiting between the positive and negative electrodes through the metal plate 81 can be prevented in a more reliable manner.

Note that the sidewalls 80b and the connection portions 80c do not have to be provided separately. For example, in the second insulating member 80, projections may be provided on the sidewalls 80b and may serve as connection portions connected to the inner side insulating member 12 serving as the first insulating member.

The inner side insulating member 12 serving as the first insulating member, and the second insulating member are, desirably, formed of resin. For example, those formed of polypropylene, polyethylene, perfluoroalkoxy alkane (PFA), polytetrafluoroethylene (PTFE), ethylene tetrafluoro ethylene copolymer (ETFE), or the like may be used.

A through hole may be provided in the second insulating member main body portion 80a of the second insulating member 80. Note that the position where the through hole is provided is, in the longitudinal direction of the sealing plate 2, the electrolyte injection hole 15 provided in the sealing plate 2 is, desirably, provided (on a gas discharge valve 17 side) with respect to the middle.

Figure 14:
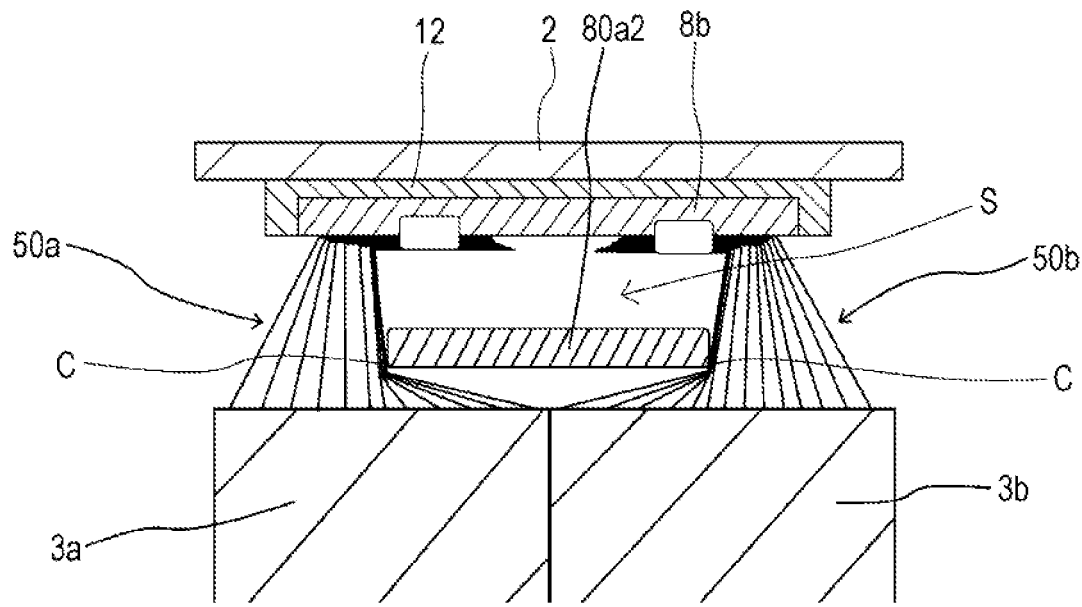
FIG. 14 is a cross-sectional view of a vicinity of a portion connecting the negative electrode tab and the second negative electrode collector to each other, taken in the short direction of the sealing plate.

FIG. 14 is a cross-sectional view of a vicinity of the portion connecting the first negative electrode tab group 50a and the second negative electrode tab group 50b to the second negative electrode collector 8b, which is taken in the short direction of the sealing plate 2. As illustrated in FIG. 14, the first negative electrode tab group 50a of the first electrode body element 3a and the second negative electrode tab group 50b of the second electrode body element 3b are each connected to the second negative electrode collector 8b by welding. Furthermore, the narrow-width portion 80a2 of the second insulating member 80 is disposed between the first negative electrode tab group 50a and the second negative electrode tab group 50b.

With such a configuration, a space S can be secured between the second negative electrode collector 8b and base portions of the first negative electrode tab group 50a and between the second negative electrode collector 8b and base portions of the second negative electrode tab group 50b. The space S becomes a flow path of the gas generated inside the electrode body 3 to the gas discharge valve 17. Accordingly, with the configuration described above, since the gas can be smoothly discharged to the outside of the battery case when abnormality occurs in the square secondary battery, the square secondary battery becomes one with a higher reliability.

In the narrow-width portion 80a2 of the second insulating member 80, corner portions C opposing the first negative electrode tab group 50a or the second negative electrode tab group 50b are, desirably, rounded. With the above, the first negative electrode tab group 50a or the second negative electrode tab group 50b can be reliably prevented from becoming damaged by the narrow-width portion 80a2 of the second insulating member 80.

Note that similar to the negative electrode side, in the positive electrode side as well, the narrow-width portion 80a2 of the second insulating member 80 is disposed between the first positive electrode tab group 40a of the first electrode body element 3a and the second positive electrode tab group 40b of the second electrode body element 3b. With the above, a space can be secured between the second positive electrode collector 6b and base portions of the first positive electrode tab group 40a and between the second positive electrode collector 6b and base portions of the second positive electrode tab group 40b.

<<First Modification>>

Figure 15:
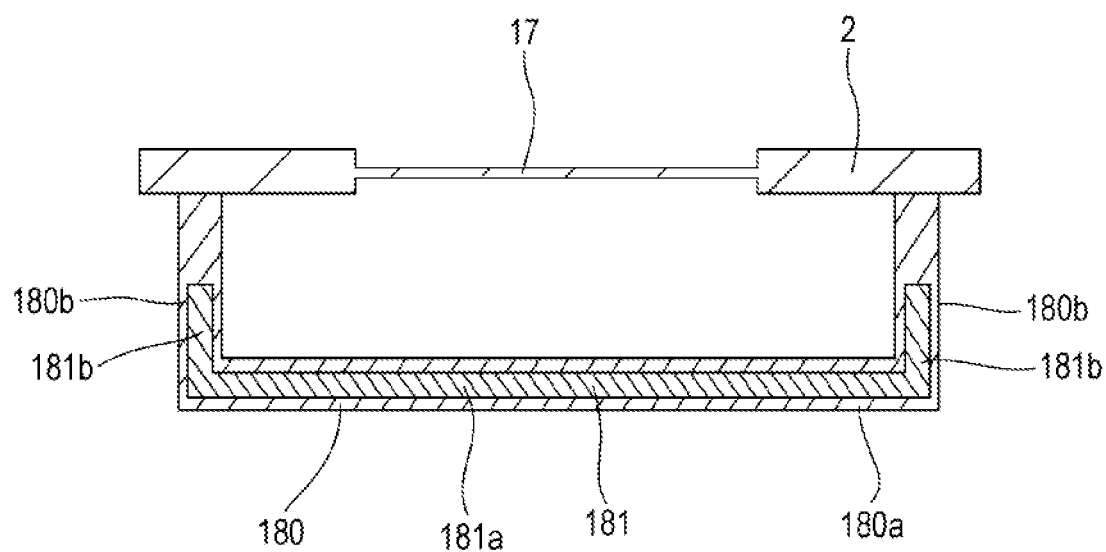
FIG. 15 is a cross-sectional view of a sealing body, a shielding member, and a second insulating member of a square secondary battery according to a first modification, taken in the short direction of the sealing plate.

FIG. 15 is a cross-sectional view of the sealing plate 2, a metal plate 181 formed of stainless steel serving as a shielding member, and a second insulating member 180 formed of resin in the secondary battery according to a first modification taken in the short direction of the sealing plate 2.

As illustrated in FIG. 15, the metal plate 181 is disposed between the sealing plate 2 and the electrode body 3 and at a position opposing the gas discharge valve 17. The metal plate 181 includes a shielding member main body portion 181a disposed so as to oppose the sealing plate 2, and a pair of shielding member lateral wall portions 181*b* that extend from both end portions of the shielding member main body portion 181*a* towards the sealing plate 2. The shielding member main body portion 181*a* is disposed substantially parallel to the sealing plate 2. For example, the inclination of the shielding member main body portion 181*a* against the sealing plate 2 may be about −10° to 10°. The shielding member lateral wall portions 181*b* are provided in the end portions of the shielding member main body portion 181*a* in the short direction of the sealing plate 2. Note that no lateral wall portions are formed on both end portion sides of the shielding member main body portion 181*a* in the longitudinal direction of the sealing plate 2.

Furthermore, the second insulating member 180 includes a second insulating member main body portion 180*a* disposed so as to oppose the sealing plate 2, and a pair of insulating member lateral wall portions 180*b* that extend from both end portions of the second insulating member main body portion 180*a* towards the sealing plate 2. The second insulating member main body portion 180*a* is disposed substantially parallel to the sealing plate 2. For example, the inclination of the second insulating member main body portion 180*a* against the sealing plate 2 may be about −10° to 10°.

The insulating member lateral wall portions 180*b* are provided in the end portions of the second insulating member main body portion 180*a* in the short direction of the sealing plate 2. The shielding member main body portion 181*a* is disposed inside the second insulating member main body portion 180*a*, and the shielding member lateral wall portions 181*b* is disposed inside the insulating member lateral wall portions 180*b*. As illustrated in FIG. 15, the insulating member lateral wall portions 180*b* are in contact with the sealing plate 2 at positions that are different from that of the gas discharge valve 17.

The metal plate 181 includes the pair of shielding member lateral wall portions 181*b*. Accordingly, in a case in which gas with a high temperature is blown out from the electrode body 3, when the second insulating member 180 is melted and the metal plate 181 moves towards the sealing plate 2 side, the shielding member main body portion 181*a* is reliably prevented from contacting with the sealing plate 2 and closing the gas discharge valve 17 and interrupting the discharge of the gas.

<<Second Modification>>

Figure 16:
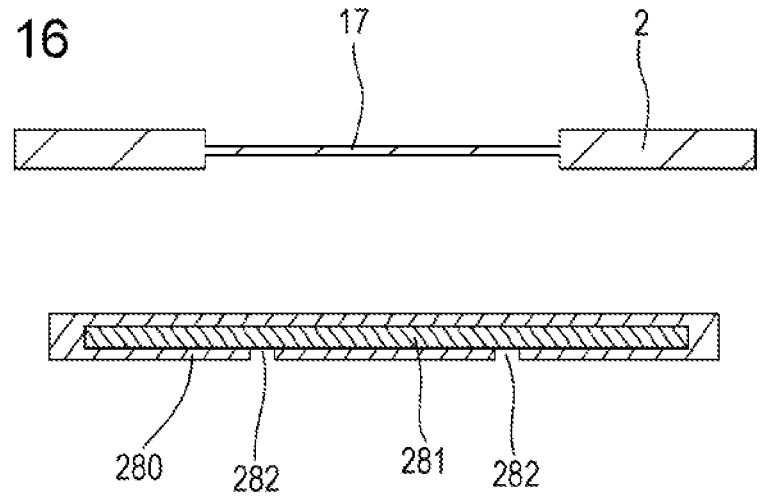
FIG. 16 is a cross-sectional view of a sealing body, a shielding member, and a second insulating member of a square secondary battery according to a second modification, taken in the short direction of the sealing plate.

FIG. 16 is a cross-sectional view of the sealing plate 2, a metal plate 281 formed of stainless steel serving as a shielding member, and a second insulating member 280 formed of resin in the square secondary battery according to a second modification taken in the short direction of the sealing plate 2.

As illustrated in FIG. 16, the metal plate 281 is disposed in the second insulating member 280. Desirably, the metal plate 281 is molded in the second insulating member 280 formed of resin. Openings 282 are formed in a surface of the second insulating member 280 on the electrode body 3 side, and the metal plate 281 is exposed at portions where the opening 282 are provided.

<<Third Modification>>

Figure 17:
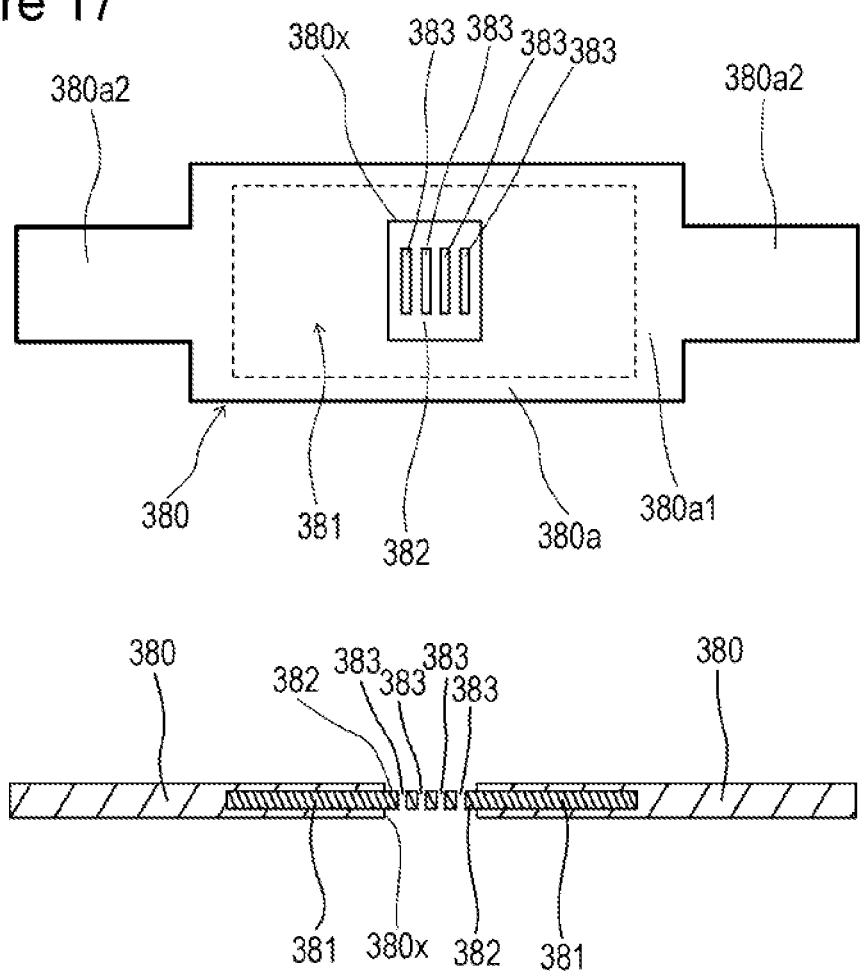
FIG. 17 is a bottom view and a cross-sectional view of a shielding member and a second insulating member of a square secondary battery according to a third modification.

FIG. 17 illustrates a diagram illustrating a bottom surface (a surface on the electrode body 3 side) of a second insulating member 380, inside of which the metal plate 381 serving as the shielding member is provided, and illustrates a cross-sectional view taken in the longitudinal direction, in a square secondary battery according to a third modification. Note that a portion indicated by a broken line in FIG. 17 is a position of an outer peripheral edge of the metal plate 381.

The second insulating member 380 includes a second insulating member main body portion 380*a* disposed so as to oppose the sealing plate 2. The second insulating member main body portion 380*a* includes a wide-width portion 380*a*1, and narrow-width portions 380*a*2 provided on both sides of the wide-width portion 380*a*1.

The second insulating member 380 includes an opening 380*x* at a position where the metal plate 381 is disposed. The metal plate 381 is exposed in the above opening 380*x*. An exposed portion 382 of the metal plate 381 is, desirably, provided at a position opposing the gas discharge valve 17. A plurality of slit-shaped through holes 383 are formed in the exposed portion 382. With such a shape, while allowing the gas to be discharged smoothly to a portion external to the battery case, high-temperature objects can be prevented from being blown out together with the flammable gas to a portion external to the battery case. Note that each through hole 383 may have a round shape, or the like.

<<Fourth Modification>>

Figure 18:
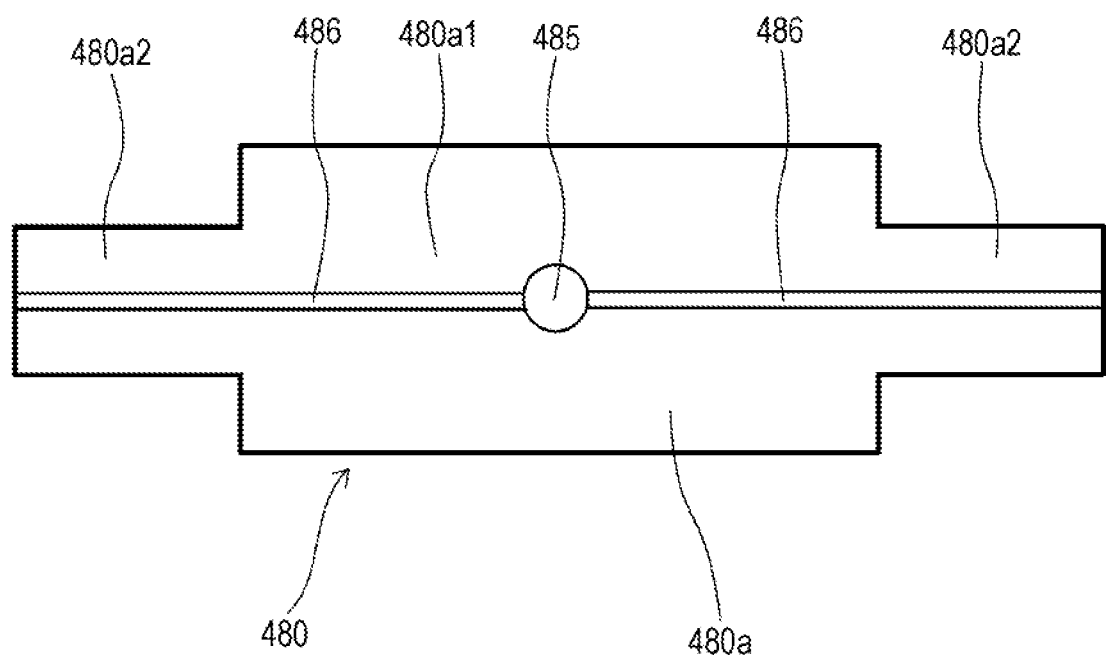
FIG. 18 is a top view of a second insulating member of a square secondary battery according to a fourth modification.

FIG. 18 is a diagram of an upper surface (a surface on the sealing plate 2 side) of a second insulating member 480 in a square secondary battery according to a fourth modification.

The second insulating member 480 includes a second insulating member main body portion 480*a* disposed so as to oppose the sealing plate 2. The second insulating member main body portion 480*a* includes a wide-width portion 480*a*1, and a pair of narrow-width portions 480*a*2 disposed on both sides of the wide-width portion 480*a*1. A width of the wide-width portion 480*a*1 in the short direction of the sealing plate 2 is larger than a width of each narrow-width portion 480*a*2 in the short direction of the sealing plate 2. The wide-width portion 480*a*1 is disposed at a position opposing the gas discharge valve 17 provided in the sealing plate 2.

An insulating member through hole 485 is provided in the second insulating member main body portion 480*a*. A position where the insulating member through hole 485 is provided in the longitudinal direction of the sealing plate 2 is, desirably, on the middle side of the sealing plate 2 with respect to the electrolyte injection hole 15 provided in the sealing plate 2. Such a configuration allows the electrolyte to be permeated to the electrode body 3 in a smoother manner. Desirably, the position where the insulating member through hole 485 is provided is a position opposing the gas discharge valve 17.

Furthermore, a groove portion 486 that extends in the longitudinal direction of the sealing plate 2 and that is connected to the insulating member through hole 485 is provided in the second insulating member main body portion 480*a*. Such a configuration allows the electrolyte to be permeated to the electrode body 3 in a smoother manner.

Particularly, as illustrated in FIG. 2, in a case in which the tabs (the positive electrode tabs 40 or the negative electrode tabs 50) are positioned below and near the electrolyte injection hole 15 provided in the sealing plate 2, and in a case in which the second insulating member is disposed below the electrolyte injection hole 15, desirably, the electrolyte injected through the electrolyte injection hole 15 moves inside the groove portion 486 and is injected inside the electrode body 3 through the insulating member through hole 485.

Note that the groove portion 486 is, desirably, inclined in the longitudinal direction of the sealing plate 2 so that a height thereof becomes gradually lower towards the insulating member through hole 485. Furthermore, in the second insulating member main body portion 480*a*, both sides of the groove portion 486 in the short direction of the sealing plate 2 can be inclined so that the height becomes gradually lower towards the groove portion 486.

<Others>

A gap may be provided between end portions of the separators constituting the electrode body 3 on the sealing plate 2 side and the second insulating member 80. In other words, the end portions of the separators constituting the electrode body 3 on the sealing plate 2 side can be configured so as not to be in contact with the second insulating member 80.

In a case in which the electrode body 3 is a stacked electrode body including a plurality of positive electrode plates and a plurality of negative electrode plates, and in a case in which the electrode body 3 is a wound electrode body in which a winding axis thereof is disposed in a direction perpendicular to the sealing plate, front end portions of the positive electrode plates, front end portions of the negative electrode plates, and front end portions of the separators are positioned on the sealing plate 2 side in the electrode body 3. With such a configuration, in a case in which the electrolyte injection hole 15 is provided in the sealing plate 2, ease of injecting the electrolyte into the electrode body 3 is improved.

In such a case, the end portions of the separators on the sealing plate 2 side, desirably, protrudes to the sealing plate 2 side with respect to the end portions of the negative electrode active material mixture layers in the negative electrode plates on the sealing plate 2 side. Furthermore, in the electrode body 3, the end portions of the separators on the sealing plate 2 side, desirably, protrudes to the sealing plate 2 side with respect to the end portions of the positive electrode active material mixture layers in the positive electrode plates on the sealing plate 2 side. Furthermore, desirably, the positive electrode plates and the separators are adhered to each other with adhesion layers, and the negative electrode plates and the separators are adhered to each other with adhesion layers. With such a configuration, the positive electrode active material mixture layers or the negative electrode active material mixture layers can be reliably prevented from becoming damaged, which is caused by the positive electrode active material mixture layers or the negative electrode active material mixture layers coming in contact with the second insulating member.

The current breaking mechanism can be provided in only either one of the conductive path between the positive electrode plates and the positive electrode external terminal 7 and the conductive path between the negative electrode plates and the negative electrode external terminal 9. In such a case, the second insulating member can only be connected to the first insulating member on the side in which the current breaking mechanism is not provided. With the above, the load on the fragile portion of the current breaking mechanism can be reduced.

As illustrated in the embodiment described above, it is desirable that the current breaking mechanism is formed in the conductive path between the positive electrode plates and the positive electrode external terminal 7. In such a case, the second insulating member can be connected to only the first insulating member on the negative electrode side.

As illustrated in the embodiment described above, it is desirable that the current breaking mechanism is formed in the conductive path between the positive electrode plates and the positive electrode external terminal 7. In such a case, the entire second insulating member 80 can be positioned on the sealing plate 2 side with respect to the end portion of the positive electrode collector member 6 on the electrode body 3 side. With such a configuration, the square secondary battery becomes one with a higher volume energy density.

In the embodiment described above, an example in which the current breaking mechanism 60 is provided in the square secondary battery has been given; however, the current breaking mechanism do not have to be provided. Furthermore, the inner side insulating member 10 and the inner side insulating member 12 may be a single component.

In the embodiment described above, an example has been given in which the inner side insulating member 12 disposed between the sealing plate 2, and the first negative electrode collector 8a and the second negative electrode collector 8b constituting the negative electrode collector member 8 is the first insulating member, and the second insulating member 80 is connected to the first insulating member. The second insulating member 80 can also be connected to the third insulating member 63 or the inner side insulating member 10 disposed between the sealing plate 2 and the positive electrode collector member 6.

In the embodiment described above, an example in which the electrode body 3 is formed of two electrode body elements 3a and 3b has been given; however, it is not limited to the above. The electrode body 3 may be a single stacked electrode body. Furthermore, the electrode body 3 may be a single wound electrode body in which a long positive electrode plate and a long negative electrode plate having a separator interposed therebetween are wound. Furthermore, the two electrode body elements 3a and 3b are each not limited to a stacked electrode body and may be a wound electrode body in which a long positive electrode plate and a long negative electrode plate having a separator interposed in between are wound.

In the embodiment described above, an example has been given in which the positive electrode collector member is formed of the first positive electrode collector and the second positive electrode collector, and the negative electrode collector member is formed of the first negative electrode collector and the second negative electrode collector; however, the positive electrode collector member may be formed of a single component, and the negative electrode collector member may be formed of a single component.

In the embodiment described above, an example has been given in which the metal plate 81 is attached to the second insulating member 80. However, the metal plate 81 is not an essential component.

In the embodiment described above, an example in which the first insulating member and the second insulating member are connected to each other has been given; however, the first insulating member and the second insulating member do not have to be connected to each other.

REFERENCE SIGNS LIST

20 square secondary battery
1 square outer package
2 sealing plate
2a positive electrode terminal attaching hole
2b negative electrode terminal attaching hole
100 battery case
3 electrode body
3a first electrode body element
3b second electrode body element
4 positive electrode plate
4a positive electrode core body
4b positive electrode active material mixture layer
4d positive electrode protective layer 40 positive electrode tab
40a first positive electrode tab group
40b second positive electrode tab group
5 negative electrode plate
5a negative electrode core body
5b negative electrode active material mixture layer
50 negative electrode tab
50a first negative electrode tab group
50b second negative electrode tab group
6 positive electrode collector member
6a first positive electrode collector
6c thin wall portion
6x collector projection
6w collector second recessed portion
6b second positive electrode collector
6b1 collector first area
6b2 collector second area
6b3 collector third area
6e target hole
6f collector first recessed portion
6y collector opening
6z opening portion
7 positive electrode external terminal
7a terminal sealing member
7x metal member
7y rubber member
7b terminal through hole
8 negative electrode collector member
8a first negative electrode collector
8x collector projection
8w collector second recessed portion
8b second negative electrode collector
8b1 collector first area
8b2 collector second area
8b3 collector third area
8e target hole
8f collector first recessed portion
8y collector opening
9 negative electrode external terminal
10 inner side insulating member
11 outer side insulating member
12 inner side insulating member
12a first insulating member main body portion
12b first sidewall
12c second sidewall
12d through hole
12e recessed portion for connection
13 outer side insulating member
14 insulation sheet
15 electrolyte injection hole
16 sealing plug
17 gas discharge valve
60 current breaking mechanism
61 conductive member
62 deformation plate
63 third insulating member
63b insulating member opening
63c insulating member projection
63x insulating member first area
63y insulating member second area
63z insulating member third area
70 fixed portion
80 second insulating member
80a second insulating member main body portion
80a1 wide-width portion
80a2 narrow-width portion
80b sidewall
80c connection portion
80c1 vertical wall
80c2 projection
81 metal plate
90 welded connection portion
180 second insulating member
180a second insulating member main body portion
180b insulating member lateral wall portion
181 metal plate
181a shielding member main body portion
181b shielding member lateral wall portion
280 second insulating member
281 metal plate
282 opening
380 second insulating member
380a second insulating member main body portion
380a1 wide-width portion
380a2 narrow-width portion
380x opening
381 metal plate
382 exposed portion
383 through hole
480 second insulating member
480a second insulating member main body portion
480a1 wide-width portion
480a2 narrow-width portion
485 insulating member through hole
486 groove portion

The invention claimed is:

1. A method of manufacturing a square secondary battery, wherein the battery includes:
    an electrode body that includes a first electrode body element and a second electrode body element, each of the first electrode body element and the second electrode body element including a positive electrode plate and a negative electrode plate;
    an outer package that includes an opening and that houses the electrode body;
    a sealing plate that seals the opening;
    a positive electrode tab provided in the positive electrode plate of the first electrode body element;
    a negative electrode tab provided in the negative electrode plate of the first electrode body element;
    a positive electrode tab provided in the positive electrode plate of the second electrode body element;
    a negative electrode tab provided in the negative electrode plate of the second electrode body element;
    a positive electrode external terminal that is electrically connected to the positive electrode tab of the first electrode body element and the positive electrode tab of the second electrode body element, and that is attached to the sealing plate;
    a negative electrode external terminal that is electrically connected to the negative electrode tab of the first electrode body element and the negative electrode tab of the second electrode body element, and that is attached to the sealing plate;
    a positive electrode collector member that electrically connects the positive electrode tab of the first electrode body element and the positive electrode tab of the second electrode body element and the positive electrode external terminal to each other;
    a negative electrode collector member that electrically connects the negative electrode tab of the first electrode body element and the negative electrode tab of the second electrode body element and the negative electrode external terminal to each other; and an insulating member that is disposed between the sealing plate and the electrode body, wherein each of the positive electrode tab of the first electrode body element, the positive electrode tab of the second electrode body element, the negative electrode tab of the first electrode body element and the negative electrode tab of the second electrode body element is located between a corresponding one of ends of the insulating member and the outer case in a short direction of the sealing plate, wherein the positive electrode collector member includes a first connection portion that connects to the positive electrode tab of the first electrode body element, and a second connection portion that connects to the positive electrode tab of the second electrode body element, wherein the first connection portion and the second connection portion of the positive electrode collector member are aligned with each other in the short direction of the sealing plate, and wherein the negative electrode collector member includes a first connection portion that connects to the negative electrode tab of the first electrode body element, and a second connection portion that connects to the negative electrode tab of the second electrode body element, wherein the first connection portion and the second connection portion of the negative electrode collector member are aligned with each other in the short direction of the sealing plate, the method of manufacturing the square secondary battery comprising:

an electrode body element fabricating step in which the first electrode body element, and the second electrode body element are fabricated;

a tab-connecting step in which the positive electrode tab of the first electrode body element is connected to the positive electrode collector member, the negative electrode tab of the first electrode body element is connected to the negative electrode collector member, the positive electrode tab of the second electrode body element is connected to the positive electrode collector member, and the negative electrode tab of the second electrode body element is connected to the negative electrode collector member; and an electrode body fabricating step in which, after the tab-connecting step, the first electrode body element and the second electrode body element are unified as one so that the insulating member is disposed between the positive electrode tab of the first electrode body element and the positive electrode tab of the second electrode body element, and between the negative electrode tab of the first electrode body element and the negative electrode tab of the second electrode body element, wherein the tab-connecting step is performed while the positive electrode collector member and the negative electrode collector member are disposed between the first electrode body element and the second electrode body element in the short direction of the sealing plate, and wherein in the electrode body fabricating step, the first electrode body element and the second electrode body element are moved toward each other in the short direction of the sealing plate while bending the positive electrode tab of the first electrode body element, the positive electrode tab of the second electrode body element, the negative electrode tab of the first electrode body element and the negative electrode tab of the second electrode body element.

2. The method of manufacturing the square secondary battery according to claim 1, wherein
the first electrode body element includes,
a first positive electrode tab group in which a plurality of the positive electrode tabs are stacked, and
a first negative electrode tab group in which a plurality of the negative electrode tabs are stacked,
the second electrode body element includes,
a second positive electrode tab group in which a plurality of the positive electrode tabs are stacked, and
a second negative electrode tab group in which a plurality of the negative electrode tabs are stacked, and
in the tab-connecting step, the first positive electrode tab group and the second positive electrode tab group are connected to the positive electrode collector member, and the first negative electrode tab group and the second negative electrode tab group are connected to the negative electrode collector member.

3. The method of manufacturing the square secondary battery according to claim 1, further comprising:
a step including unifying the first electrode body element and the second electrode body element as the electrode body, wrapping the electrode body with an insulation sheet, and inserting the electrode body into the outer package.

4. The method of manufacturing the square secondary battery according to claim 1, wherein
the insulating member includes
an insulating member main body portion disposed so as to oppose the sealing plate, and
a pair of insulating member lateral wall portions that extend from the insulating member main body portion towards the sealing plate, and
the insulating member main body portion is disposed at a position distanced away from the sealing plate.

5. The method of manufacturing the square secondary battery according to claim 1, wherein
the insulating member includes
a wide-width portion,
a first narrow-width portion, and
a second narrow-width portion,
a dimension of the wide-width portion in the short direction of the sealing plate is larger than a dimension of the first narrow-width portion in the short direction of the sealing plate and a dimension of the second narrow-width portion in the short direction of the sealing plate,
the wide-width portion is located between the first narrow-width portion and the second narrow-width portion in a longitudinal direction of the sealing plate,
the first narrow-width portion is also disposed between the positive electrode tab of the first electrode body element and the positive electrode tab of the second electrode body element, and
the second narrow-width portion is also disposed between the negative electrode tab of the first electrode body element and the negative electrode tab of the second electrode body element.

6. The method of manufacturing the square secondary battery according to claim 1, wherein
the sealing plate includes an electrolyte injection hole,
the insulating member includes an insulating member through hole, and in a longitudinal direction of the sealing plate, the insulating member through hole is positioned on a middle side of the sealing plate with respect to the electrolyte injection hole.

7. The method of manufacturing the square secondary battery according to claim 6, wherein
the insulating member includes a groove portion in a surface thereof on a sealing plate side, the groove portion extending in the longitudinal direction of the sealing plate and being connected to the insulating member through hole.

8. The method of manufacturing the square secondary battery according to claim 1, wherein
the positive electrode collector member includes a first positive electrode collector and a second positive electrode collector,
the negative electrode collector member includes a first negative electrode collector and a second negative electrode collector,
in the tab-connecting step,
the positive electrode tab of the first electrode body element and the positive electrode tab of the second electrode body element are connected to the second positive electrode collector,
the negative electrode tab of the first electrode body element and the negative electrode tab of the second electrode body element are connected to the second negative electrode collector, and
after the tab-connecting step,
the second positive electrode collector is connected to the first positive electrode collector, and
the second negative electrode collector is connected to the first negative electrode collector.

9. The method of manufacturing the square secondary battery according to claim 1, further comprising:
an insulating member securing step in which the insulating member is secured to the sealing plate,
wherein the electrode body fabricating step is performed after the insulating member securing step.

10. The method of manufacturing the square secondary battery according to claim 9,
wherein the insulating member securing step is performed after the tab-connecting step.

11. The method of manufacturing the square secondary battery according to claim 1, wherein
a distal end of the positive electrode tab of the first electrode body element is disposed on the positive electrode collector member and extends parallel to the first electrode body element during the tab-connecting step,
a distal end of the positive electrode tab of the second electrode body element is disposed on the positive electrode collector member and extends parallel to the second electrode body element during the tab-connecting step,
a distal end of the negative electrode tab of the first electrode body element is disposed on the negative electrode collector member and extends parallel to the first electrode body element during the tab-connecting step, and
a distal end of the negative electrode tab of the second electrode body element is disposed on the negative electrode collector member and extends parallel to the second electrode body element during the tab-connecting step.

* * * * *